R. M. WADE.
Car Brake.
No. 17,004.
Patented Apr. 7, 1857.
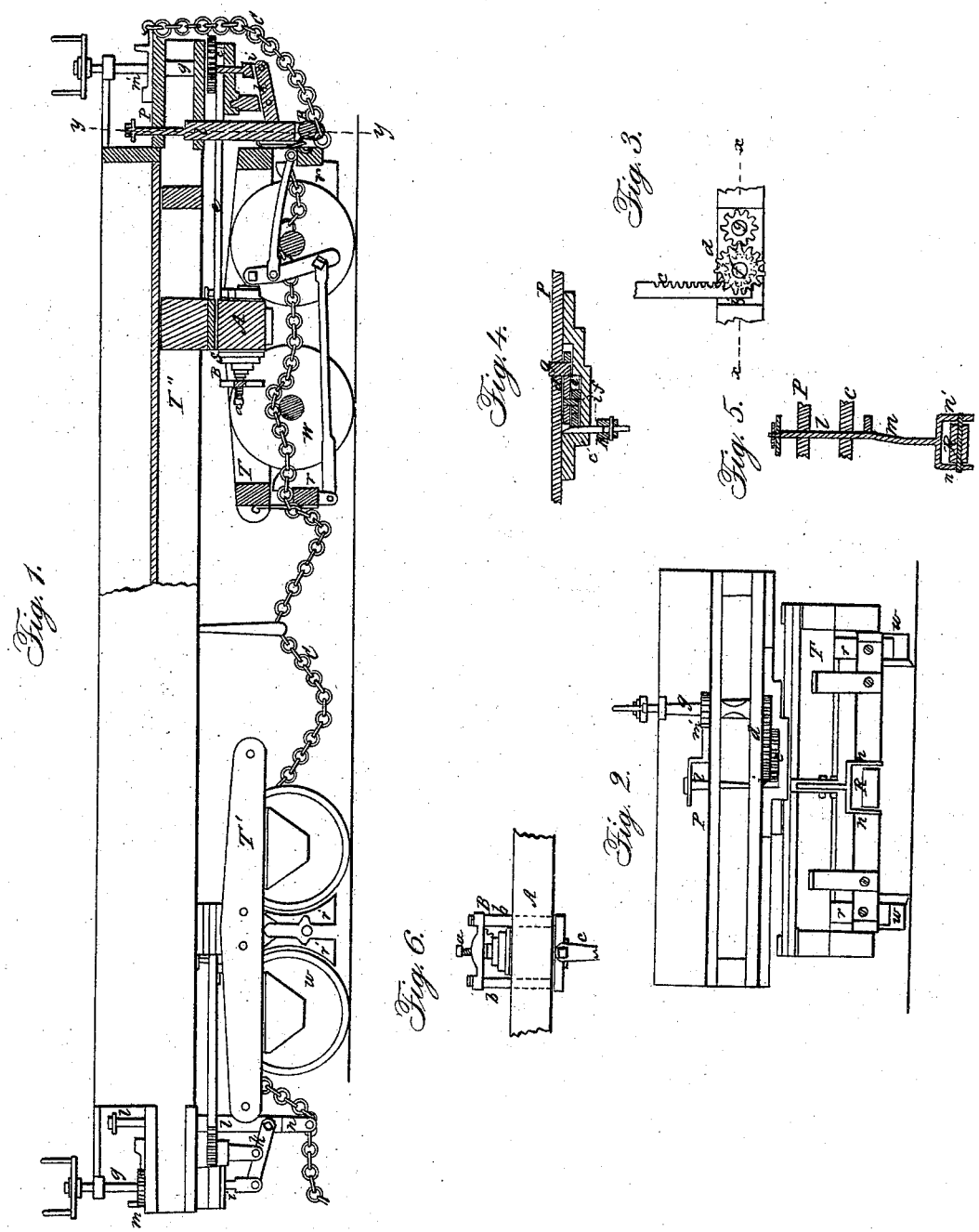

UNITED STATES PATENT OFFICE.

R. M. WADE, OF WADESVILLE, VIRGINIA.

RAILROAD-CAR BRAKE.

Specification of Letters Patent No. 17,004, dated April 7, 1857.

*To all whom it may concern:*

Be it known that I, R. M. WADE, of Wadesville, in the county of Clark and State of Virginia, have invented a new and useful Improvement in Railroad - Car Brakes; and I do hereby declare that the following is a full, clear, and exact description of the construction and operation of the same, reference being had to the annexed drawing, forming part of this specification, in which—

Figure 1 shows a side elevation, and a vertical longitudinal section of a car with my improved brake attached. Fig. 2 is a front elevation of the car. Fig. 3 is a plan view of cog wheels on rack under platform of car. Fig. 4 is a vertical section on $x\, x$, Fig. 3. Fig. 5 is a section on $y\, y$ of Fig. 1, taken through axis of roller R. Fig. 6 is a view showing connection of rack rod with spring.

Similar characters of reference in the several figures denote the same part.

The character of brake to which my invention applies, is that in which the braking action is effected by the strength of a spring.

The invention consists both in the manner of applying the rubbers to the wheels and withdrawing the same. I use a volute spring of sufficient strength to produce the sliding of the wheels, when it is allowed to act; and compress the spring to relieve the wheels, by drawing upon a yoke inclosing it, by a rack and pinion, operated from the platform, the rack being made to engage the pinion, by the action of a wedge moving upward against its back, the withdrawal of the wedge serving to disengage them, a lever connection with the wedge, and a rod attached thereto, serving to place the disengagement under the control of the brakeman; while all the wedges in the train as under the control of the engineer, the details of construction and operation being as follows.

In the drawing T T' are the trucks of a car; the wheels of the former having the rubbers $r$ common to passenger cars, and the latter the rubbers $r'$, used on freight cars, my invention being designed for application to cars as now constructed.

Against the cross piece A of the truck, and held by yoke B, is the volute spring S, its strength adjusted by screw $a$. The bars $b$ of the yoke are capable of movement through the cross piece A, so that the spring may be compressed by the longitudinal movement of rack rod $c$. This rod is drawn toward the end of the car by pinion $e$ on shaft $f$; wheel $d$ on same shaft being rotated by the turning of shaft $g$ by the brakeman. This movement of the rack takes place only when the rack is made to engage the pinion $e$, by the pressure of wedge $i$ at the back of the rack. This wedge is attached to the end of a lever $k$, the extremity of whose other arm is connected with a bar $l$, extending upward above the surface of the platform P. This bar has a slight curve, as shown in Fig. 5; which, as said bar is pressed downward, tends to throw the rack $c$ into contact with the pinion, at the time when the upward movement of wedge $i$, produced by the action of bar $l$ on lever $k$, completes the engagement of the teeth of pinion and rack. The curve $m$ serving to move the rack rod laterally sufficient to admit the wedge behind it. The lower extremity of this rod $l$, has branches $n$, in which is a roller R. Under these rollers throughout the length of the train, runs a loose chain C, fastened to the rear car, and wound upon a drum in front. This drum may be turned either by hand or by steam, the action being to straighten the chain, and in so doing raise all of the rods $l$, and by withdrawing the wedges $i$, liberate the springs S throughout the train, thus producing the pressure of the rubbers on all of the wheels W.

The operation of this brake is as follows: Rods $l$ are forced down by pressure on their heads, causing the meshing of rack and pinion. The shaft $g$ is then turned by the brakeman, and the spring S thus taken up, the ratchet and pawl $m'$ holding it in position. This is done throughout the train. The straightening of the chain C causes the instantaneous application of all the rubbers to the wheels, and the progress of the train is arrested. Any one spring can be liberated by the lifting of bar $l$, by hand.

I disclaim the application of the brake rubbers by springs; and the drawing up of the springs by means of rack and pinion. But

I claim as new and of my own invention and desire to secure by Letters Patent—

1. The wedge $i$, lever $k$, and bar $l$, constructed arranged and operating substantially as described, in combination with the rack c, for the purposes specified.

2. I also claim, the aforesaid wedge, lever, and bar; in combination with the slack chain, for effecting the simultaneous application of the brake rubbers throughout the train, substantially as set forth.

In testimony whereof I have hereunto signed my name before two subscribing witnesses.

ROBT. M. WADE.

Witnesses:
GEO. PATTEN,
JOHN S. HOLLINGSHEAD.